United States Patent

Hafner

[15] 3,706,996

[45] Dec. 19, 1972

[54] FREQUENCY ADJUSTMENT FOR TWO-WAY VIDEO TRANSMISSION

[72] Inventor: Theodore Hafner, 1501 Broadway, New York, N.Y. 10036

[22] Filed: April 14, 1970

[21] Appl. No.: 28,302

[52] U.S. Cl. .........................343/176, 325/5, 325/51

[51] Int. Cl. ...............................................H04b 1/50

[58] Field of Search........325/3, 5, 17, 25, 51, 53, 54, 325/55, 57; 343/175, 176, 177, 179; 178/DIG. 3; 333/95 S

[56] References Cited

UNITED STATES PATENTS

| | | | |
|---|---|---|---|
| 2,064,907 | 12/1936 | Green | 325/5 X |
| 3,426,279 | 2/1969 | Berman | 343/179 |
| 2,909,600 | 10/1959 | Becker | 178/DIG. 3 |
| 3,028,594 | 4/1962 | Rychlik | 325/25 X |
| 2,685,068 | 7/1954 | Goubau | 333/95 S |

*Primary Examiner*—Benedict V. Safourek
*Attorney*—Theodore Hafner

[57] ABSTRACT

The invention relates to the simultaneous transmission of of number of carrier modulated video channels wherein each of a number of stations has assigned to it transmitter and receiver channels,, different carrier frequencies, at least each of said transmitter carriers being adjustable to the carrier frequency of at least some of the other transmitters; means for adjusting the assigned carrier frequency of one of said transmitters to a carrier frequency assigned to another transmitter, and means under control of said adjustment substantially simultaneously to adjust the carrier frequency assigned to said other transmitter to the carrier frequency assigned to the first transmitter so as to permit the two stations, the receiver carrier frequencies of which remain unchanged, upon being called upon by one of said stations to exchange video information substantially simultaneously.

21 Claims, 4 Drawing Figures

INVENTOR
THEODORE HAFNER

INVENTOR
THEODORE HAFNER

FREQUENCY ADJUSTMENT FOR TWO-WAY VIDEO TRANSMISSION

One of the objects of this invention is the exchange of video or videophone information between a number of independent stations comprising transmitter and receiver equipment operative on different assigned carrier frequencies, and in a common transmission medium such as the public air space, but also and preferably on private type of transmission medium of broadband character, which would not require the allocation of public channels.

A more specific object of the invention is to permit videophone transmission and reception of a surface wave transmission line or G-Line (trademarked), which for example with a bandwidth of 200 Mhz in the VHF range, permits the simultaneous transmission of at least 20 video channels, or videophone channels, in each direction, on different VHF carrier frequencies, and thereby in accordance with the invention, permits at least twenty stations connected to the common transmission medium or G-Line, substantially independently, and simultaneously, to exchange video or videophone information with one another, preferably substantially without the intermediary of an exchange or other type of intervening switching station.

In a specific embodiment of the invention, a station which wants to call on another station connected to the medium, simply adjusts its own assigned transmitter carrier frequency, to that of the other station with which it wants to exchange video or videophone information (or what may be called "see-speak"); under control of this adjustment, the calling transmitter will emit a calling signal on the carrier frequency assigned to the called transmitter, and this calling signal, may be used at the called station, to adjust the assigned carrier frequency of the called transmitter, to the carrier frequency of the calling transmitter, thereby permitting, through this exchange of assigned carrier frequencies, an exchange of video or videophone information between the calling and the calle station.

In accordance with this aspect of the invention, the carrier frequencies assigned to the receiver equipment in the different stations remain substantially unaltered.

In a modification of the invention, the calling signal emitted from the calling station, may be of such a nature, or effective on such equipment at the called station, that the adjustment of called carrier frequency be only effected, after the called station has indicated its readiness to exchange information, by provision of a manual or automatic signal which if not existing, would disable the mechanism for changing the assigned carrier frequency of the called station.

Figure 1:
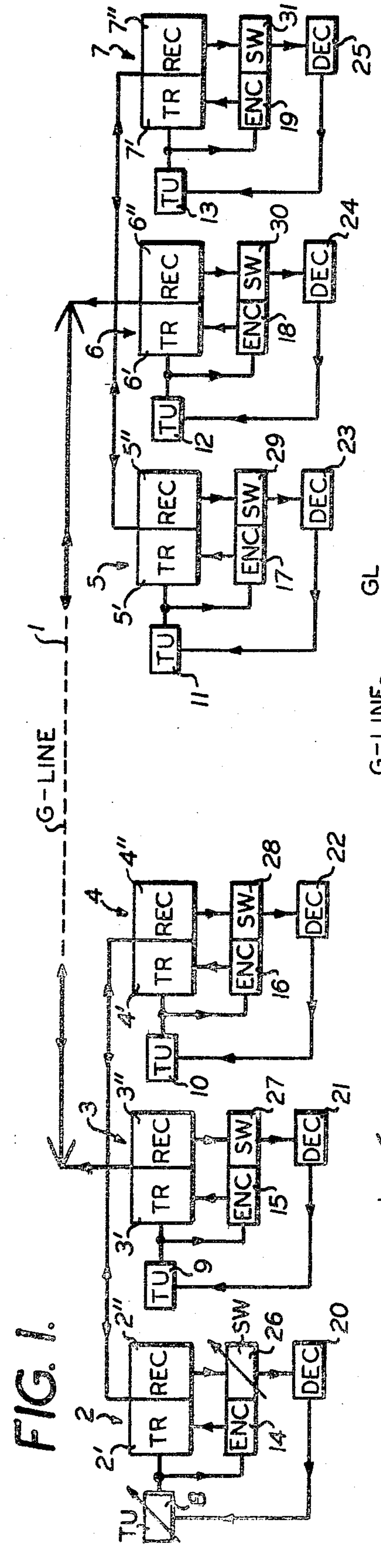

These and other objects of the invention will be more fully apparent from the drawings annexed herein, in which FIG. 1 represents in block diagram an application of certain principles of the invention to a surface wave transmission line, especially in the form of a surface wave corridor such as disclosed in U.S. Pat. application Ser. No. 673,311.

With respect to this patent application, the present application may be considered as a continuation in part.

Figure 2:
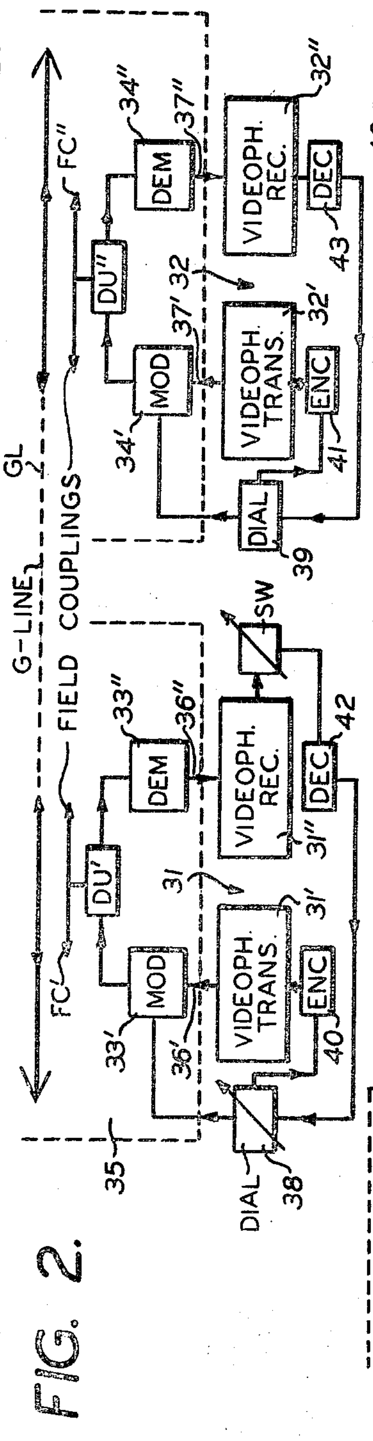
Figure 3:
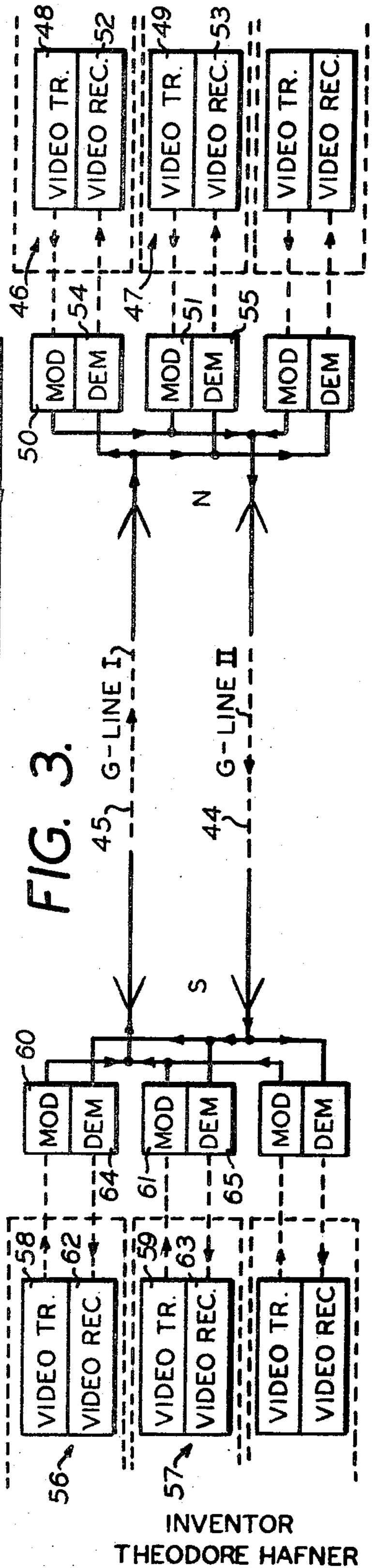
Figure 4:
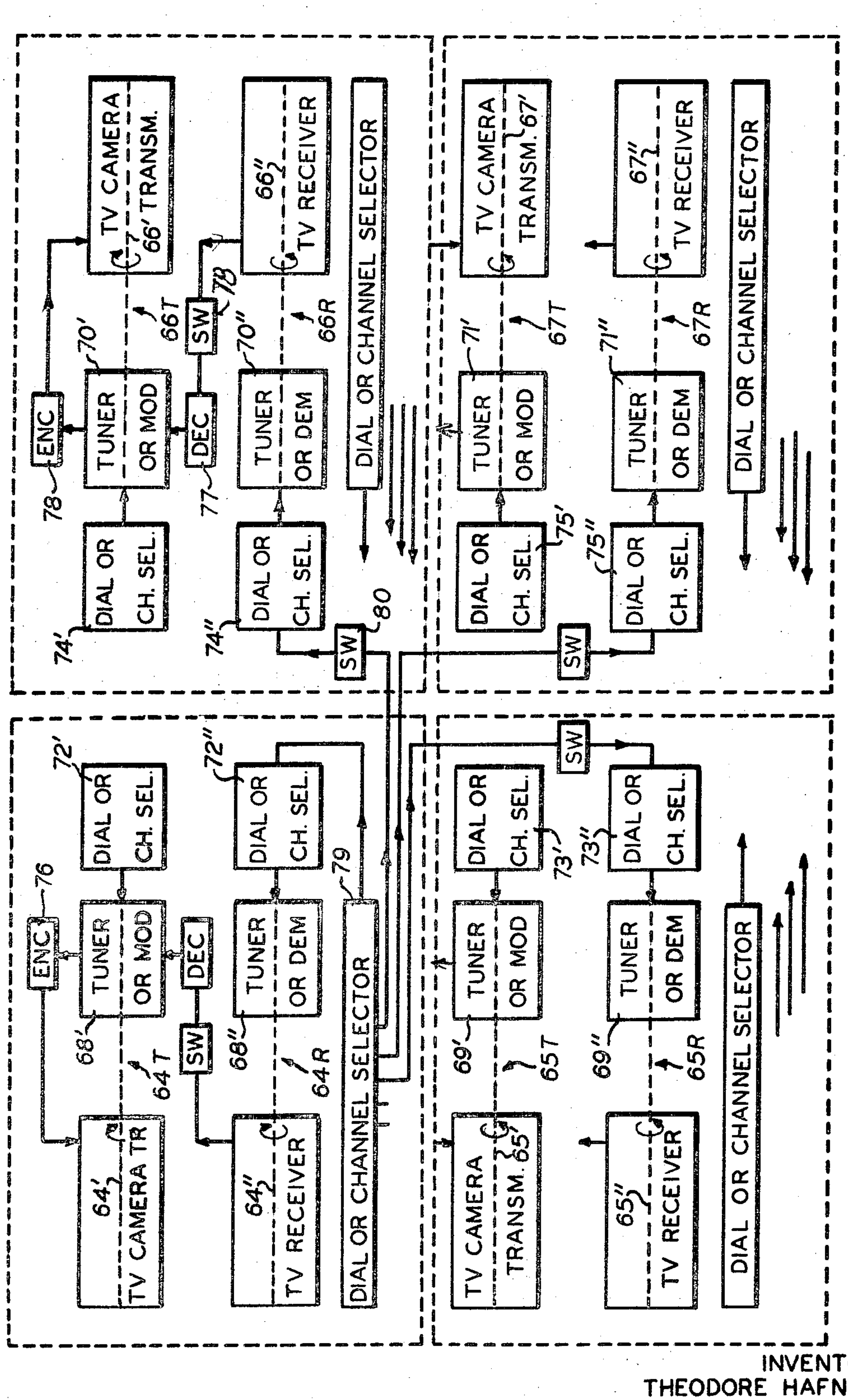

FIG. 2 shows a portion of FIG. 1, in greater detail, and FIGS. 3 and 4 present modifications of both FIG. 1 and FIG. 2.

FIG. 1 shows at 1, a surface wave transmission line such as extended along a road or any other private right of way, such as disclosed in the abovenamed patent application, or more generally in U.S. Pat. No. 2,865,068.

However in the present application, the surface wave transmission line is of the type forming a lowloss, boradband surface wave corridor which permits a great number of channels to be connected to the line directly, or indirectly (such as by field coupling such as described in U.S. Pat. Nos. 3,290,626 and 3,201,724); such a line for example if applied in the VHF range may be used to carry simultaneously sufficient viedeo or phone channels or both, and in both directions, to cover a frequency range of 200 Mhz, and even more in the UHF range.

Thus for example, with each video or videophone channel, covering a bandwidth of about 4 Mhz, 20 stations can be connected to the line, each having different assigned transmit and receive carrier frequencies. With a bandwidth of only 1 Mhz assigned to each carrier frequency, as would be ordinarily sufficient for the exchange of business information, 80 stations could be accomodated for information exchange through one surface wave transmission line.

Naturally, and without departing from the scope of this invention, several surface wave transmission lines, or surface wave corridors can be arranged in parallel, thereby doubling or multiplying the channel carrying capacity of the entire system.

Since surface wave transmission lines, if propagating in the same directions, cannot be arranged in parallel, unless separated by relatively considerable distances (of the order of several wave lengths for example), it is provided in accordance with another feature of this invention, to propagate adjoining surface wave in opposite directions, in other words, and preferably, to use one surface wave corridor for the transmission of transmit frequencies only, while an adjoining surface wave corridor will be used for the transmission of receive frequencies only; in this wave, as a further advantage of such an arrangement, the frequency band of the medium can be exploited to an optimum, with a minimum of guard band.

With this sort of a parallel arrangement of oppositely directed surface wave transmission lines, the spacing between the lines can be held at a minimum, and since the phase velocities of the adjoining lines, while being of the same magnitude, are of different sign, energy transfer from one line to an adjacent line can be minimized.

As further apparent from FIG. 1, a number stations are connected to line 1, indicated schematically at 2, 3, 4, 5, 6, and 7, each containing a transmitter and a receiver, 2', 2'', 3', 3'', 4', 4'', 5', 5'', 6', 6'', and 7', 7'', respectively. Each of the six stations has assigned to it separate and different transmit and receive carrier frequencies, carrying each for example a complete television channel including video and sound information; thus just a matter of exemplifying such assignments in connection with a 200 Mhz VHF surface wave transmission line, stations 2 and 3 occupy channels corresponding to TV channels No. 2 and No. 3; stations 4 and 5 correspond to channels No. 4 and No. 5; station 6 would occupy channels corresponding to TV channel No. 6, and station 7 may have assigned to it TV channel 7, and so on until every one of the stations connected to the line, has transmit and receive equipment designed to operate on predetermined, assigned carrier frequencies, substantially independent from each other.

Such equipment is well known per se, and it also well known, especially as apparent from the patent applications and patents mentioned above, how to connect such equipment to a surface wave transmission line, either by direct connection or by indirect coupling to the surface wave field.

In addition to having predetermined assigned transmit and receive carrier frequencies for each station, in accordance with the invention, one of the equipment contained in each station, and especially the transmit equipment, has a tuning adjustment which is also well known per se, and therefore does not need to described in detail, which permits the transmit carrier to be changed or adjusted to another carrier frequency; such a tuner or modulator is indicated in FIG. 1, schematically at 8, 9, 10, 11, 12. and 13, respectively for transmitters 2', 3', 4', 5', 6', 7'.

In addition, each of the transmitters is provided with a pulse source or encoder schematically indicated in FIG. 1, at 14, 15, 16, 17, 18, snf 19, respectively which also under control of the operation of the tuner 9, 10 etc. causes the transmitter 2', 3', etc. to emit a predetermined code on its band, or part thereof, which, if received in another station will be decoded, and operative to change or adjust the transmitter associated with that receiver, to change or adjust its assigned frequency to that of the first transmitter prior to its adjustment under control of tuner 8, 9, etc. The corresponding decoding devices connected to the receivers and controlling the associated transmitter, or at least its tunig device, are indicated schematically in FIG. 1, at 20, 21, 22, 23, 24, and 25, respectively.

Such encoding and decoding devices are well known per se, as well as the means under their control, and indicated in FIG. 1 by lines, for changing or adjusting the transmit frequency.

Such adjustments means may be in the form of electrical motors, or switches, or motor switches, or may also consist of electronic circuitry for changing the tunig conditions of the transmitters, without the use of mechanical means.

Naturally, and this also without departing from the scope of this disclosure, some of these electrical or electronic adjustments or controls, may be replaced by manual means where the adjustment may be effected by the person participating in the information exchange, for example by the called person under instruction from the caller. For example, the caller after changing manually his assigned transmit frequency to that of the desired called station, and indicating in his transmission the assigned frequency of his own station, will thus cause the called station to switch its assigned frequency to that of the callers original frequency, which of course is the frequency permanently assigned to the caller's receiver, thereby permitting exchange of information whereby the caller assumes the assigned frequency of the called, and the called assumes the assigned frequency of the caller; the frequencies of the correspon receivers remaining substantially unaltered, i.e. substantially coinciding with the originally assigned frequencies of both stations.

In order to better assure proper opration of the equipment, in accordance with another feature of the invention, the operation of the transmitter tuning equipment of the called station may be inhibited in case the called station would be occupied or otherwise unavailable for information exchange.

In this specific embodiment of the invention, as also apparent from FIG. 1, a switch is inserted in the line between the receiver and the encoder, or between the encoder and the tuner. Such switch is schematically indicated in FIG. 1, at 26, 27, 28, 29, 30, and 31, respectively, and it may be in any desired form such as a manually actuated push button or cradle switch operated by the removal or placement of a more or less standard telephone hand set, or in any other desired manner which would indicate the ability of the called station for information exchange.

Such switch may also be replaced if necessary by an automatic switch permitting the desired interconnection without any manual movement.

FIG. 2 shows a portion of FIG. 1 in a somewhat modified arrangement. In this case a number of subscriber stations are provided in the form of video transmission and video receiving equipment 31',31'', 32', 32'' . . . , transmitters 31', 32' . . . being connected to control a modulator schematically indicated at 33', 34' . . . , while receivers 31'',32'' . . . are connected to be controlled by a corresponding demodulator schematically indicated at 33'', 34'' . . . respectively. Modulators 33', 34' are adjustable to different assigned carrier frequencies of the subscriber's frequency spectrum, which as stated above, in the case of a VHF G-Line surface wave corridor may encompass a bandwidth of about 200 Mhz, or extend from 50 to 250 Mhz, without requiring FCC frequency allocations, and therefore substantially independent in the assignments of the location and banndwidth of its carrier frequencies.

In the examples shown in FIG. 1 and FIG. 2, the receiver carrier frequency is fixed, and coincides with the carrier frequency assigned to, and characterizing the identity of the station concerned.

Modulators and demodulators of the type described in FIG. 2 are well known per se, as well as the means for their adjustment or tuning to the different carrier frequencies forming the frequency spectrum of this information exchange system. For this reason, the adjustability of modulators 33', 34' . . . is merely indicated by an arrow.

This type of an arrangement has the advantage that the video equipment involved in this arrangement for example in the case of television transmission, a television camera forming the transmitter and a television receiver forming the receiver equipment, will be relatively simple and light in the absence of any carrier frequency equipment which in this embodiment of the invention, has been separated from the video portions. It therefore can be easily installed in offices or other relatively restricted localities, while the modulating and demodulating equipment can be located remote from transmitters and receivers at a central location, for example on the roof or the cellar of the office building, whereby the transmission losses from the terminal equipment to this central location, could be held to a tolerable minimum.

Such a central location is indicated in FIG. 2 at 35, in dotted lines, and the connection between modulators and demodulators on the one side, and transmitters and receivers, on the other side, may be realized by coaxial cable, or any other type of low loss connection, as schematically indicated in FIG. 2, by lines 36', 37', . . . and 36'', 37'' . . . respectively.

However in order to adjust the assigned carrier in accordance with the invention, to a desired called carrier, modulators 33'34' will have to be adjusted from a distance, i.e. the point of the physical location of transmitter and receiver equipment 31, 32. Such adjustment can be effected by means of well known switching or dialling equipment, indicated in FIG. 2 at 38, 39 . . . , An additional encoding equipment also controlled by switch 38, 39 . . . and schematically indicated in FIG. 2 at 40, 41 . . . , serves to operate or trigger the transmitter 31, 32 . . . in such a way that at reception at the called station, it will be decoded by a corresponding decoder schematically indicated in FIG. 2, at 42, 43 and used to change at the called station, the assigned carrier frequency to that of the called station. This will permit effective information exchange between a great number of stations, without the involvement of central switch board. Bidirectional field couplings FC' and FC'', connect 33, 33'', 34', 34'' over duplexers DU',DU'' to G-Line GL.

The connections between control or switching equipment 38, 39 . . . and modulators 33', 34' . . . , can be effected by the same coaxial cable which connects the transmitter and receiver equipment to the central location 35, on appropriate carrier frequencies, or on separate wires, without departing from the scope of the invention, which may carry the desired instructions in code to the modulators to be decoded by corresponding decoders, which may be either separate or included in the modulators which they are to control.

In a similar manner, any fo the equipments hown in FIGS. 1 and 2, such as tuners modulators, transmitters, receivers, encoders and decoders may be combined into single units, preferably equipped in accordance with the present stae of the art, with solid state circuitry to reduce space requirements, to a minimum, and at the same time to facilitate operation and maintenance by permitting rapid replacement of parts and units, with a minimum of service interruption.

In the embodiment of the invention illustrated in FIG. 3, two G-Lines or surface wave corridors are schematically indicated at 44, 45 which are arranged to operate in opposite directions, and therefore could be disposed at relatively close range of the order of about one wave length of the larger waves in the frequency spectrum under consideration.

In this arrangement, at one end of the two lines 44, 45, a number of subscriber stations schematically shown at 46, 47 . . . have their transmitters 48, 49 through modulators 50, 51 connected to line 44 which propagates a surface wave in the direction N–S, while the corresponding receivers 52, 53 are arranged to receive their information from demodulators 54, 55 connected to line 45 which propagates its surface wave in the opposite direction, S–N.

Similarly, at the opposite ends of the lines 44,45, in subscriber stations 56, 57, transmitters 58, 59 are connected over adjustable modulators 60, 61 to line 45, while the corresponding receivers schematically indicated at 62, 63 are connected over demodulators 64, 65 to line 44. Otherwise the operations of calling and responding are controlled in a manner similar to that shown with respect to FIGS. 1 and 2, for example by adjusting the assigned carrier frequency of the calling transmitter to that of the desired called transmitter, and at the same time under control of such adjustment, and provided the called station is ready for information exchange, also to adjust the assigned frequency of the called transmitter to that of the calling transmitter before it had been adjusted by the caller.

Such adjustments and controls can be effected by encoding and decoding equipment otherwise well known per se, and interconnected between the controlling and the controlled equipments in a manner indicated in with respect to FIGS. 1 and 2, or in any other appropriate manner without departing from the scope of this disclosure.

Naturally also without departing from the scope of the invention subscribers' stations may not only be connected to the ends of lines but also anywhere between intermediate poins, either directly through surface wave launching and receiving horns, or indirectly through fixed or movable field coupling as indicated in the patents and patent applications mentioned above.

Further more, equally in accordance with the invention, the surface wave corridor or corridors may be extended to any desired length or lengths by the insertion of appropriate amplifier stations which may be bidirectional, if the line is to operate simultaneously in opposite directions, or unidirectional, if separate lines are provided to operate in opposite directions.

If one line carries surface waves propagating in opposite directions, it will be necessary, at the terminals of the line, to separate the opposite channels either by appropriate filters, bidrectional couplers or similar equipment well known from the art of using the same equipment, antennas, cable and the like to carry signals of different frequencies, and/or of different directions.

FIG. 4 illustrates an embodiment of the invention, adapted to be applied to existing television cameras and existing television receivers, having tuners in the form of rotatable disks, the axes of which are indicated in FIG. 4 schematically, at 64', 64'', and 65', 65'', for the cameras and receivers of one set of stations, and 66', 66'', and 67', 67'', for the cameras and receivers of another set of stations. The rotation of axes 64, 67 . . . is controlled into predetermined position by a selsyn motor or a motor driven switch, schematically indicated, FIG. 4 at 68', 68'', 69', 69'', 70', 70'', and 71', 71'', respectively, which in turn, can be controlled if necessary from a distance, by corresponding pulse generators, dialling or like pulse sources, schematically indicated at 72', 72'', 73', 73'', 74', 74'', and 75', 75'', respectively. Encoders 76, 77, etc. serve to store the pulse information received from dialing source 72', 73', 74', and 75', respectively, so that adjusting the tuning position of say shaft 64' , from its assigned carrier frequency, to the assigned frequency of another station, for example that represented by tuning shafts 66', 66'', switch motor 68', will be turned to that called station frequency, and at the same time information corresponding to the identity of the carrier frequency of the calling station will be stored in 76., until shaft 64' has reached the frequency position desired by the caller. In this position, the information stored in 76 is released and transmitted through the station camera 64T, and on a frequency assigned to the called station, to the receiver 66R of the called station, where it will be decoded in 77, and used to drive the motor switch 70' associated with the tuning shaft 66' of the camera of the called station, into a position in which camera 66T has the assigned carrier frequency of the caller station 64T, and the caller station 64T has the assigned carrier frequency of the called station 66T. Since the associated receivers 64R and 66R retain their originally assigned frequencies stations 64T, R and 66T, R, are now in a position to exchange video and/or videophone information over their assigned frequency carriers and in a common transmission medium such a surface wave corridor produced by one or more G-Lines.

In this connection it should be noted, that in accordance with the invention exchange of visual or any similar broadband information, can be achieved not only between sets of stations as indicated in FIGS. 1, 2, 3 and 4, at both ends of a common transmission medium, but evidently, and with the same means, information exchange can also be achieved between stations of one set only; in this case the common transmission medium may be represented by a coaxial cable or any similar line permitting the simultaneous transmission of a number of carrier frequencies in one or in two directions.

In a modification of the embodiment shown in FIG. 4, the operation of the called tuner motor 70'' may be inhibited by the operation of a switch inserted somewhere into the line and for example indicated at 78. Such inhibition may be desired in case the called station, in this case 66R, T, is busy, inoperative or unwilling to enter into the visual exchange. In this case the inhibiting element may be part of the circuitry of 66R or 66T without departing from the scope of this disclosure.

As a further alternative arrangement, or combined with the preceding one, a visual information exchange may not only be accomplished bu adjusting the caller's transmit frequency, to that of the called station, and adjusting the called transmit frequency to that of the caller; in principle similar results can be achieved by adjusting the caller's receive frequency to that of the called station, and by adjusting the called receive frequency to that of the caller. Such distant controlled tuning devices are indicated in FIG. 4, at 68'', 72'', 69'', 73'', 70'', 74'', 71'', 75'' . . . respectively.

In this case, each of the stations is provided with an encoder or dialling device, 79 which upon being operated in a certain switching position, generates a code capable of operating the tuning device of the caller from its receive carrier frequency to a certain called frequency, and also simultaneously to adjust the called receive carrier frequency to that of the caller. Since each of the stations involved in this visual information exchange, must be capable of being controlled from any other station, the code signals must be transmitted to the different stations by a separate wire, or wires, or a separate high frequency carrier, with transmitting and receiving equipment being provided therefor at both coding and decoding terminations. In view of the small bandwidth required for such code transmission, in case of surface wave transmission, the G-Line cable itself may be used, without interfering with its surface wave functions, and with low frequency or direct current pulses.

In this type of an arrangement, enabling and disabling functions similar to those described with respect to FIGS. 2, 3 and 4, may be applied, permitting the called station in case of inability or unwillingness to receive, to inhibit any adjustment of its receive carrier frequency, by the provision of a switch in the line schematically indicated at 80. Such switching element may also be part of the camera and receiver circuitry, in a position for example, in case camera and receiver of a certain station are "busy," to interrupt the arrival of any codes demanding an adjustment of the called receive carrier frequency.

Similarly to accepted telephone practice, such type of code transmission, whether on carrier frequencies, or on separate wire, or on G-Line cable, may also be used to indicate the caller either a busy sign, or an absent sign, either in acoustical form such as ringing, or in visual form such as lighting, or in case of the exchange of television information, by indications on the receiver screen itself, all this without departing in any way from the scope of this disclosure.

Generally, the invention is not limited to the circuits, circuit connections, and circuit elements shown or described. Nor is it limited to the specific structures of transmitters, receivers, modulators, demodulators, and their switching or control apparatus. The invention can be applied with substantially equal effect to the transmission of any type of visual information, such as photostats, or photoelectric information, computer data, radar or other signals derived from cathode ray screens or other display devices, with or without the accompanyment of sound or other relative narrow band information which is combined with relatively broadband information in the visual or quasivisual form of representation.

I claim:

1. In a system for exchanging visual information, a transmission medium common to a number of different carrier frequencies modulated by said information, means for adjusting at least one of said carrier frequencies to another one, means under control of said adjustment means to adjust another carrier having a frequency corresponding to said other frequency, to the frequency of the first carrier prior to its adjustment, and means associated with the different carriers for receiving the different information.

2. System according to claim 1, wherein said common transmission medium is a surface wave propagation system operative in both directions, and adapted to transmit visual information in one direction, and receive visual information in an opposite direction; a number of stations being connected to said line, each having an assigned carrier frequency, and comprising transmitting and receiving means for said assigned carrier frequency; the transmitting means in each station being adjustable to at least a number of said assigned carrier frequencies, and further means in each station under control of an adjustment of said transmitting means from the assigned frequency to another frequency, to adjust the carrier frequency of the transmitting means in another station having said adjusted frequency as an assigned frequency, to another carrier frequency corresponding to that which the transmitter of the first station had assigned to it prior to its adjustment to said other carrier frequency.

3. System according to claim 1, corresponding means under control of said first adjustment, for signalling the initiation of the second adjustment, and proceeding with said second adjustment under control of said signalling means.

4. System according to claim 1, comprising a number of stations connected to said common transmission medium, each having transmitting and receiving means, of one of said assigned carrier frequencies, and means for adjusting the transmit carrier of one of said stations to effect information exchange with another one of said stations.

5. System according to claim 1, comprising a number of stations connected to said common transmission medium, each having transmitting and receiving means, of one of said assigned carrier frequencies, and means for adjusting the receive carrier of one of said stations to effect information exchange with another one of said stations; additional transmitting means being provided at each of said stations to control the called station from the calling station to initiate adjustment of the called receive carrier under control of the adjustment of the calling receive carrier.

6. System according to claim 1, comprising a number of stations connected to said common medium, at least some of them comprising each video transmitting means and modulating means controlled by said video means to produce at least one assigned carrier frequency, and means for adjusting said modulating means to a number of other assigned carrier frequencies; and means under control of an adjustment of an assigned carrier frequency to another carrier frequency assigned to another station, to adjust the assigned carrier frequency of said other station to the assigned carrier frequency which the firat station had prior to its adjustment.

7. System according to claim 1, comprising a number of stations connected to said common medium, at least some of said stations comprising video receiving means and demodulating means controlling said video means for converting at least one assigned carrier frequency to video information, means for adjusting said converting means to convert a number of assigned carrier frequencies to video information, means under control of an adjustment of one assigned carrier frequency at one of said stations to another assigned carrier frequency at one station, to adjust the converting means at another station which has said assigned carrier frequency, to the carrier frequency which the first station had prior to the adjustment of its convering means; additional means being provided the adjustment from one station to another.

8. In combination, an electromagnetic wave transmission medium permitting the simultaneous propagation of number of video modulated high frequency carrier waves, a number of stations connected to said medium having different predetermined carrier frequency ranges assigned to them, transmitting and receiving means at each of said stations for said carrier frequency ranges, including means for changing in at least one of said transmitting and receiving means the assigned carrier frequency range to another assigned carrier frequency range; and means at the station having said other assigned carrier frequency under control of the carrier change at said one station to effect an inverse carrier change at said other station, thereby providing each of said two stations with identical pairs of transmit and receive carrier frequency ranges so as to permit a two-way information exchange between said two stations.

9. System according to claim 8, comprising means for changing the transmit carrier range at one station to one assigned to another station, and means including the transmitting means at the first station to change the transmit carrier range at said other station to the transmit carrier range which the first station had before it was changed; said transmitting means further including means for signalling to the other station the arrival of said change, and means under control of said signalling means selectively to permit or inhibit occurrence of said change.

10. System according to claim 8, comprising means for changing the receive carrier range at one station to one assigned to another station, and additional transmitting means at the first station to change the receive carrier range at said other station to the receive carrier which the first station had before it was changed; said additional transmitting means including signalling means at the first station and receiving means at the other station to indicate readiness to accept said receive carrier change, means under control of said receiving means for permitting or inhibiting said change.

11. In combination, a pair of adjoining transmission media which are substantially independent from each other, each being adapted to propagate a number of video modulated high frequency carrier ranges substantially independent from each other; the two media propagating in opposite directions; a number of stations connected through said media, each station including transmitting and receiving means having an assigned carrier frequency range, at least one of said means being adjustable from its assigned range to another range; the transmitting means of each station at one end of said media being connected through one of said media to the receiving means of each station at the other end of said media; and the transmitting means of each station at the other end of said media being connected through the other medium to the receiving means of each station at the first end of said media; means for adjusting the carrier range in a station at one end of the media, to a carrier range prevailing in a station at the other of said media, and means under control of said adjustment to adjust the carrier range prevailing at said second station, to that which prevailed at the first station prior to its adjustment, thereby permitting the two station at the opposite ends of said media, to exchange information on identical pairs of transmit and receive carriers.

12. System according to claim 11, wherein said adjoining media are substantially parallel surface wave transmission line, arranged at a distance of at least wave length dimension so as to permit substantially the same carrier frequencies propagated over each of said lines, without interfering with each other.

13. System according to claim 11, wherein the transmit carriers are adjustable; an adjustment at one of said stations at one end of said media, causing an inverse adjustment at another station at the other end of said media; means being provided under control of of the first adjustment and prior to the second adjustment, for signalling at the other station the prospective occurrence of said second adjustment, and means under control of said signalling permitting the inhibition of said second adjustment.

14. System according to claim 11, wherein the receive carriers are adjustable; an adjustment in one of said station at one of said media, causing an inverse adjustment of the receiver carrier in another station at the other end of said media, additional transmitting means being provide at one end of said media, and additional receiving means therefor at the other end of said media; the additional transmitting means at said one station causing the additional receiving means at the other station to inform the prospective arrival of said second adjustment; and means under control of said additional receiving means at the other station for signalling such arrival, thereby permitting passage or inhibition od said second adjustment at said other station.

15. In a common transmission medium, first means for transmitting and means for receiving one assigned video modulated high frequency carrier range, second means for transmitting and means for receiving another assigned video modulated high frequency carrier range, means for changing one of said first means from its assigned carrier range to said other carrier range, and means under control of said change for changing one of said second means from said other carrier range to the first carrier range.

16. System according to claim 15, comprising means under control of said first change for indicating said change, and means under control of said indicating means selectively to permit or inhibit the occurrence of said second change.

17. System according to claim 15, comprising separate transmission lines operative in opposite directions, said first means having transmitting and receiving means, connected, respectively to differently directed transmission lines at one end thereof; and and said second means having transmitting and receiving means, connected, respectively, to oppositely directed transmission lines at the other end thereof.

18. In a method for exchanging video information between a number of stations, the steps of providing a transmission medium for a number of video modulated high frequency carrier ranges, assigning each of said stations a predetermined carrier range, adjusting the transmit carrier range of a calling station to that of the station to be called, and adjusting under control of said adjustment the transmit carrier range of the called station to that which the calling station had prior to its first adjustment.

19. Method according to claim 18, wherein the first adjustment is signalled at the called station before the second adjustment is applied to permit the called station to allow or inhibit the second adjustment.

20. In a method for exchanging video information between a number of stations, the steps of providing a transmission medium for a number of video modulated high frequency carrier ranges, assigning each of said stations a predetermined carrier range, adjusting the receive carrier range of a calling station to that of the station to be called, and adjusting under control of said adjustment the receive carrier range of the called station to that which the calling station had prior to its first adjustment.

21. Method according to claim 20, wherein the first adjustment is signalled at the called station before the second adjustment is applied, to permit the called station to allow or inhibit the second adjustment.

* * * * *